United States Patent
Chen

(10) Patent No.: US 9,820,122 B2
(45) Date of Patent: Nov. 14, 2017

(54) METHOD OF PERFORMING AUTOMATIC PLMN SELECTION IN IOPS-CAPABLE WIRELESS COMMUNICATION SYSTEM

(71) Applicant: ACER INCORPORATED, New Taipei (TW)

(72) Inventor: Pei-Jung Chen, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 15/006,059

(22) Filed: Jan. 25, 2016

(65) Prior Publication Data

US 2016/0345151 A1    Nov. 24, 2016

Related U.S. Application Data

(60) Provisional application No. 62/165,218, filed on May 22, 2015.

(51) Int. Cl.

| | |
|---|---|
| *H04M 11/04* | (2006.01) |
| *H04W 4/22* | (2009.01) |
| *H04W 48/16* | (2009.01) |
| *H04W 60/00* | (2009.01) |
| *H04B 17/309* | (2015.01) |
| *H04M 15/00* | (2006.01) |
| *H04W 48/18* | (2009.01) |

(Continued)

(52) U.S. Cl.
CPC ............ *H04W 4/22* (2013.01); *H04B 17/309* (2015.01); *H04M 15/7556* (2013.01); *H04W 48/16* (2013.01); *H04W 48/18* (2013.01); *H04W 60/005* (2013.01); *H04W 76/007* (2013.01); *H04W 84/042* (2013.01)

(58) Field of Classification Search
CPC ....... H04W 4/22; H04W 48/18; H04W 48/16; H04W 60/005; H04W 84/042; H04W 76/007; H04M 15/7556; H04B 17/309
USPC ........................................................ 455/404.1
See application file for complete search history.

(56) References Cited

U.S. PATENT DOCUMENTS

| | | | |
|---|---|---|---|
| 6,799,038 B2* | 9/2004 | Gopikanth | H04W 48/18 455/414.1 |
| 8,700,037 B2* | 4/2014 | Hietalahti | H04W 48/18 455/432.1 |

(Continued)

FOREIGN PATENT DOCUMENTS

WO    WO 2015152681 A1 *    10/2008

OTHER PUBLICATIONS

General Dynamics UK Ltd., pCR to 33.997: Discussion of IOPS AKA and Key Issues text proposal, 3GPP TSG SA WG 3 (Security) Meeting #79, Apr. 20-24, 2015, S3-151509, revision of S3-131278, XP050963091, Nanjing, China.

(Continued)

*Primary Examiner* — Amancio Gonzalez
(74) *Attorney, Agent, or Firm* — Winston Hsu

(57) ABSTRACT

A wireless communication system includes an LOPS-capable user equipment, an LOPS-mode eNB and a normal-mode eNB. When the user equipment is under the coverage of both the LOPS-mode eNB and the normal-mode eNB, the user equipment is configured to perform automatic PLMN by registering on both the IOPS-mode eNB and the normal-mode eNB so as to maintain both normal-mode communications and IOPS mode communications.

9 Claims, 7 Drawing Sheets

(51) Int. Cl.
  *H04W 76/00*    (2009.01)
  *H04W 84/04*    (2009.01)

(56) References Cited

U.S. PATENT DOCUMENTS

| | | | |
|---|---|---|---|
| 8,825,047 B2 * | 9/2014 | Saini | H04W 48/16 |
| | | | 455/418 |
| 8,862,078 B2 * | 10/2014 | Yu | H04W 76/025 |
| | | | 370/280 |
| 2009/0312020 A1 | 12/2009 | Lee | |
| 2014/0228039 A1 | 8/2014 | Zhao | |

OTHER PUBLICATIONS

3rd Generation Partnership Project; Technical Specification Group Core Network and Terminals; Non-Access-Stratum (NAS) functions related to Mobile Station (MS) in idle mode (Release 13), Mar. 2015, 3GPP TS 23.122 V13.1.0, Technical Specification, pp. 1-46, XP050927768.

Samsung et al., IOPS solution for backhaul-less scenario, SA WG2 Meeting #107, Jan. 26-30, 2015, pp. 1-7, S2-150346, revision of S2-15xxxx, XP050942317, Sorrento, Italy.

Ericsson, PLMN Selection, SA WG2 Meeting #108, Apr. 13-17, 2015, pp. 1-5, S2-151316, revision of S2-150774, XP050962599, San Jose Del Cabo, Mexico.

* cited by examiner

METHOD OF PERFORMING AUTOMATIC PLMN SELECTION IN IOPS-CAPABLE WIRELESS COMMUNICATION SYSTEM

CROSS REFERENCE TO RELATED APPLICATIONS

This application claims priority of U.S. Provisional Application No. 62/165,218 filed on 2015 May 22.

BACKGROUND OF THE INVENTION

1. Field of the Invention

The present invention is related to a method of performing an automatic PLMN selection in an IOPS-capable wireless communication system, and more particularly, to a method of performing an automatic PLMN selection in an IOPS-capable wireless communication system for maintaining both normal-mode communications and IOPS mode communications.

2. Description of the Prior Art

The 3rd Generation Partnership Project (3GPP) has developed a universal mobile telecommunications system (UMTS) which adopts a wideband code division multiple access (WCDMA) technology capable of providing high frequency spectrum utilization, universal coverage, and high-speed/quality multimedia data transmission. In the UMTS, a radio access network known as a universal terrestrial radio access network (UTRAN) includes multiple Node-Bs (NBs) for communicating with multiple user equipment (UE). Furthermore, a long-term evolution (LTE) system is now being developed by the 3GPP in order to further improve performance of the UMTS to satisfy users' increasing needs. The LTE system includes a new radio interface and radio network architecture which provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs and a core network (CN) which includes a mobility management entity (MME), a serving gateway (SGW) and other devices for non-access stratum (NAS) control.

In 3GPP Release 13, a study item was studied on isolated E-UTRAN operations for public safety (IOPS) in support of mission critical network operation for public safety (PS). The main idea laid behind this IOPS study item is to investigate needs and requirements for E-UTRAN operations when encountering connection problems with the macro evolved packet core (EPC).

For the scenario that an eNB has no backhaul to the macro EPC, the general IOPS architectural requirements include:
(a) When a UE accesses the eNB in an IOPS mode of operation, a local IP connectivity and transport public safety service shall be provided to the UE by a local EPC connected to the eNB, if authorized.
(b) An eNB that supports IOPS may enter the IOPS mode of operation after it detects lack of S1 connectivity to the macro EPC. The decision by an eNB to enter the IOPS mode of operation shall be made in accordance with the local policies of the radio access network (RAN) operator.

According to related 3GPP document, the macro EPC is the EPC which serves an eNB in normal mode of operation, while the local EPC is an entity which provides functionality used by an eNB in IOPS mode of operation in order to support public safety services. A nomadic eNB (NeNB) is a nomadic cell which may include a base station, antennas, microwave backhaul and support for local services. The NeNB is intended for PS use by providing coverage or additional capacity where coverage was never present (e.g. forest fire or underground rescue) or where coverage is no longer present (e.g. due to natural disaster). An isolated E-UTRAN can be created by either an E-UTRAN without normal connectivity with the macro EPC or deployed NeNBs with E-UTRAN functionality provided by a local EPC.

FIG. 1 is a diagram illustrating an LOPS architecture of an E-UTRAN 100 in response to an outage event within the network. An isolated E-UTRAN 100A can be created from the E-UTRAN 100 following an event which isolates a part of the E-UTRAN 100 from normal connectivity with the macro EPC or following deployment of standalone E-UTRAN NeNBs within a part of the E-UTRAN 100. The isolated E-UTRAN 100A may include (1) operation with no connection to the macro EPC; (2) one or multiple eNBs; (3) interconnection between eNBs; (4) limited backhaul capacity to the macro EPC; and (5) the services required to support local operations (e.g. group communication) in the case of no network coverage or of limited network coverage.

Referring to FIG. 1, the isolated E-UTRAN 100A can be created when the outage event has been occurred within the wireless communication system. The eNBs in the normal-mode E-UTRAN 100B are connected to the macro EPC by backhaul connection and the macro EPC is connected to the application server. When the isolated E-UTRAN 100A is created, the eNBs in the isolated E-UTRAN 100A are able to support services required for local operations even though a connection to the normal mode E-UTRAN 100B, as well as to the macro EPC, has been cut off.

FIG. 2 is a diagram illustrating UE behavior in an LOPS-capable wireless communication system. For illustrative purpose, it is assumed that a coverage area 20A is served by an LOPS-mode eNB1 (i.e., isolated from the macro EPC) and a coverage area 20B is served by a normal-mode eNB2 (i.e., connected to the macro EPC). PS UE0~UE5 represent LOPS-capable mobile devices which can support a PS band. The PS UE1~UE3 may be served by one or multiple cells in the LOPS-mode eNB1 and get connected to each other if the LOPS operation allows it. The PS UE4~UE5 may be served by one or multiple cells in the normal-mode eNB2 and get connected to each other. The PS UE0 is under the coverage of both the LOPS-mode eNB1 and the normal-mode eNB2. According to 3GPP document TR 23.797 section 6.1, the eNB1 starts advertising an LOPS-dedicated public land mobile network identity (PLMN-ID) in the IOPS mode and only authorized PS UEs can attach to the corresponding IOPS-dedicated PLMN. In the prior art method of performing automatic PLMN selection in the IOPS-capable wireless communication system, UEs are configured to treat this IOPS-dedicated PLMN-ID with lower preference for E-UTRAN access so that other PLMNs of the macro EPC are selected with precedence. In other words, since the PS UE0 is under the coverage of both the IOPS-mode eNB1 and the normal-mode eNB2, the PS UE0 is configured to select the PLMN-ID received from the normal-mode eNB2 and register on the normal-mode eNB2. Under such circumstance, the PS UE0 is able to communication with the PS UE4~UE5, but lost connection with the PS UE1·UE3.

According to 3GPP document TR 23.797 section 6.1, the user can also perform a manual PLMN selection at any time. For example, the user may select the IOPS-dedicated PLMN-ID received from the IOPS-mode eNB1 for the PS UE0 to register on the IOPS-mode eNB1. Under such circumstance, the PS UE0 is able to communication with the PS UE1~UE3, but lost connection with the PS UE4~UE5.

Therefore, there is a need for a method of performing automatic PLMN in an IOPS-capable wireless communication system in order to improve UE's ability to maintain both normal-mode communications and IOPS mode communications.

SUMMARY OF THE INVENTION

The present invention provides a method of performing an automatic PLMN selection in an IOPS-capable wireless communication system. The method includes a user equipment selecting a first PLMN as a primary PLMN and registering on the primary PLMN; the user equipment performing a PLMN search when registering on the primary PLMN; the user equipment determining if a second PLMN which is currently unable to provide connectivity to the first PLMN can be detected in the PLMN search; the user equipment selecting the second PLMN as a secondary PLMN if the second PLMN can be detected in the PLMN search; and the user equipment registering on both the primary PLMN and the secondary PLMN after selecting the secondary PLMN.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
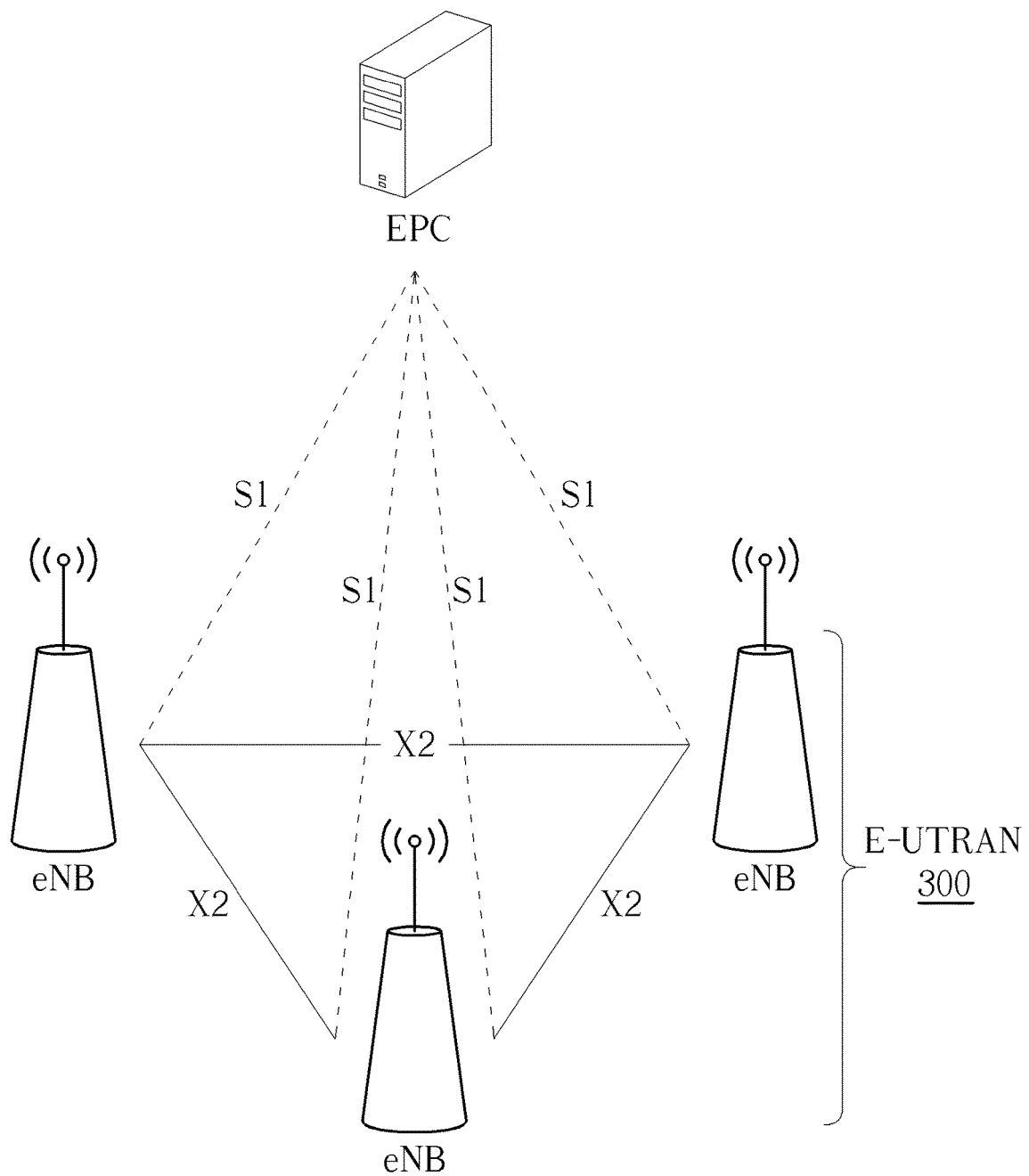
FIG. 3 is a diagram illustrating a network structure of an E-UTRAN system according to an embodiment of the present invention.

FIG. 3 is a diagram illustrating a network structure of an E-UTRAN system 300 according to an embodiment of the present invention. The E-UTRAN system 300 includes one or more base stations eNBs connected to each other through X2 interfaces, wherein the X2 user plane interface (X2-U, not shown) is defined between eNBs for providing nonguaranteed delivery of user plane protocol data units (PDUs), and the X2 control plane interface (X2-CP, not shown) is defined between two neighbor eNBs. Each eNB may be connected to the macro EPC through an S1 interface, wherein the S1 user plane interface (S1-U, not shown) is defined between the eNB and the serving gateway (not shown) for providing nonguaranteed delivery of user plane PDUs between the eNB and the serving gateway, and the S1 control plane interface (S1-MME, not shown) is defined between the eNB and the mobility management entity (not shown).

Figure 4:
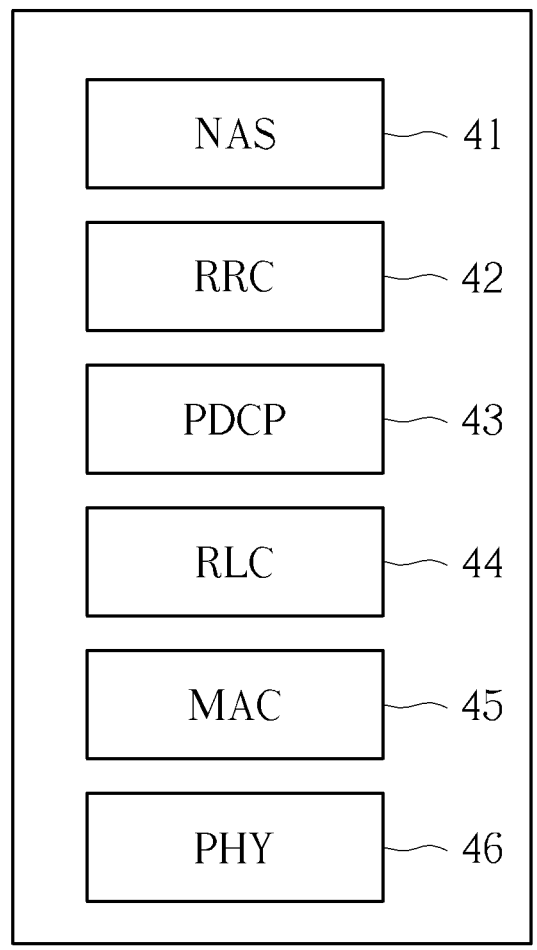
FIG. 4 is a diagram illustrating an LTE protocol stack adopted by an E-UTRAN system according to an embodiment of the present invention.

FIG. 4 is a diagram illustrating an LTE protocol stack adopted by the E-UTRAN system 300 according to an embodiment of the present invention. The LTE protocol stack includes a NAS layer 41, a radio resource control (RRC) layer 42, a packet data convergence protocol (PDCP) layer 43, a radio link control (RLC) layer 44, a medium access control (MAC) layer 45, and a physical (PHY) layer 46. The LTE protocol stack shown is typically implemented on a mobile terminal (user equipment). The NAS layer 41 is configured to maintain a list of allowed PLMN types and a list of PLMN-IDs in priority order, thereby performing PLMN selection accordingly for the user equipment to camp on. The RRC layer 42, the PDCP layer 43, the RLC layer 44, the MAC layer 45, and the PHY layer 46 are considered access stratum (AS) layers, which handle functions related to the transmission of data over the radio interface and the management of the radio interface of the user equipment. Specifically, one function of the AS layers includes supporting PLMN selection of the NAS layer 41 by searching for and reporting available PLMNs to the NAS layer 41.

Figure 5:
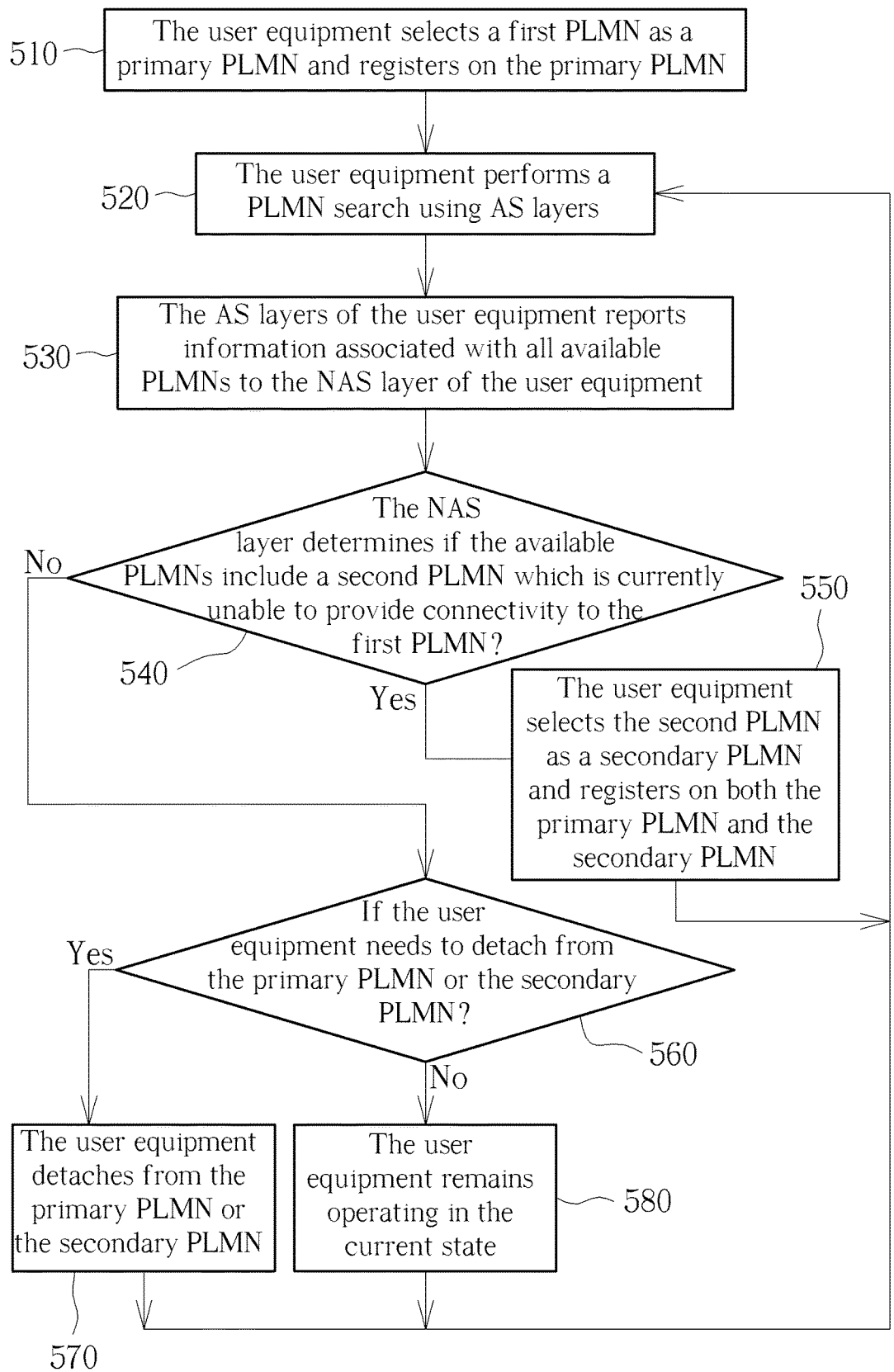
FIG. 5 is a flowchart illustrating a method of performing automatic PLMN selection in an IOPS-capable wireless communication system according to an embodiment of the present invention.

FIG. 5 is a flowchart illustrating a method of performing automatic PLMN selection in an IOPS-capable wireless communication system according to an embodiment of the present invention.

Step 510: the user equipment selects a first PLMN as a primary PLMN and registers on the primary PLMN; execute step 520.

Step 520: the user equipment performs a PLMN search using AS layers; execute step 530.

Step 530: the AS layers of the user equipment reports information associated with all available PLMNs to the NAS layer of the user equipment; execute step 540.

Step 540: the NAS layer determines if the available PLMNs include a second PLMN which is currently unable to provide connectivity to the first PLMN; if yes, execute step 550; if no, execute step 560.

Step 550: the user equipment selects the second PLMN as a secondary PLMN and registers on both the primary PLMN and the secondary PLMN; execute step 520.

Step 560: determine if the user equipment needs to detach from the primary PLMN or the secondary PLMN; if yes, execute step 570; if no, execute step 580.

Step 570: the user equipment detaches from the primary PLMN or the secondary PLMN; execute step 520.

Step 580: the user equipment remains operating in the current state; execute step 520.

In the present invention, one of the first PLMN and the second PLMN is currently unable to connect to the macro EPC, possibly due an outage event within the wireless communication system. In an embodiment, the first PLMN is a normal PLMN connected to the macro EPC which serves the user equipment in normal mode of operation, while the second PLMN is an IOPS PLMN connected to a local EPC which provides a local IP connectivity and public safety services to the user equipment in IOPS mode of operation when the backhaul to the macro EPC is lost or not available. In another embodiment, the first PLMN is an IOPS PLMN connected to a local EPC which provides a local IP connectivity and public safety services to the user equipment in IOPS mode of operation when the backhaul to the macro EPC is lost or not available, while the second PLMN is a normal PLMN connected to the macro EPC which serves the user equipment in normal mode of operation.

Figure 6:
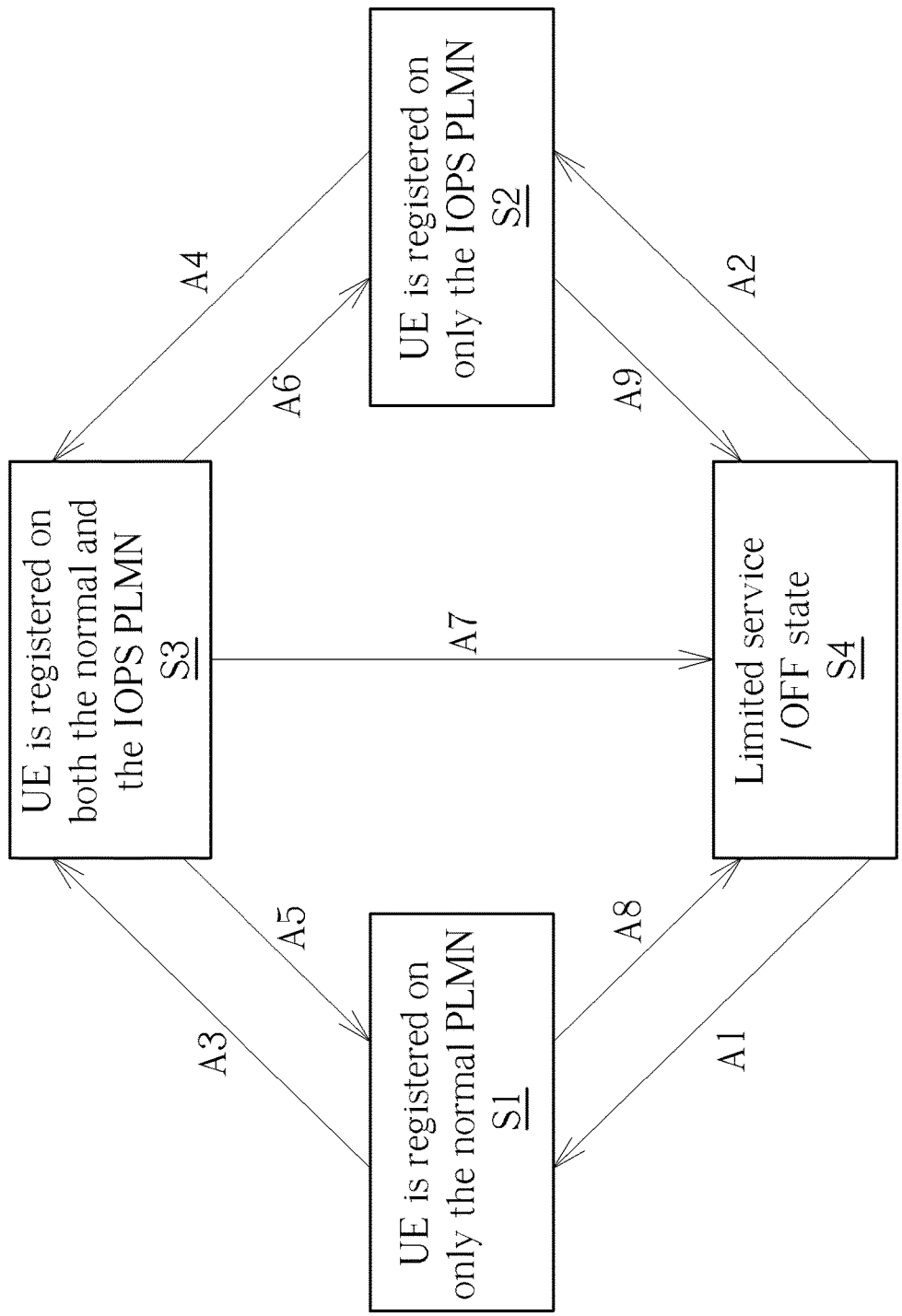
FIG. 6 is a diagram illustrating the operational state of an LOPS-capable user equipment according to an embodiment of the present invention.

FIG. 6 is a diagram illustrating the operational state of an IOPS-capable user equipment according to an embodiment of the present invention. As depicted, the user equipment may operate in one of the following four states S1~S4, and the state transitions are indicated by arrows A1~A9.

S1: the user equipment is registered on only the normal PLMN;

S2: the user equipment is registered on only the LOPS PLMN;

S3: the user equipment is registered on both the normal PLMN and the IOPS PLMN; and S4: the user operates in limited service state or OFF state (before switch-on).

In step 510, the user equipment is configured to select the first PLMN as the primary PLMN and register on the first PLMN. Referring to FIG. 6, the user equipment may switch from state S4 to state S1 or S2 after executing step 510, as indicated by arrow A1 or A2.

In the present invention, step 510 may be executed in a PLMN selection procedure which is performed at switch-on or on recovery from lack of coverage. Most mobile devices are able to provide two modes for PLMN selection: manual mode and automatic mode. In the manual mode, the user equipment camps on whatever network that user specifies. In the automatic mode, a target PLMN is selected based on predefined guidelines. According to related 3GPP document, the user equipment equipped with a smartcard, such as a subscriber identity module (SIM) card, is configured to select and register on a target PLMN based on predefined guidelines in the following order. However, the method of selecting the primary PLMN does not limit the scope of the present invention.

(1) a home PLMN (HPLMN): a PLMN with a mobile country code (MCC) and a mobile network code (MNC) that match the MCC and MNC of the international mobile subscriber identity (IMSI) associated with the user equipment;

(2) each PLMN in the "User Controlled PLMN Selector with Access Technology" data field in the SIM card (in priority order);

(3) each PLMN in the "Operator Controlled PLMN Selector with Access Technology" data field in the SIM card (in priority order);

(4) other PLMN/access technology combinations with received high quality signal in random order; and (5) other PLMN/access technology combinations in order of decreasing signal quality.

In step 520, the user equipment is configured to perform the PLMN search using AS layers. The AS layers may scan all the radio frequency (RF) channels within UE's supported RF bands and read system information (SI) to identify each PLMN. The PLMN search may be performed according to related 3GPP document. However, the method of performing the PLMN search does not limit the scope of the present invention.

In step 530, the AS layers of the user equipment are configured to report the information associated with all available PLMNs to the NAS layer of the user equipment. The reported information may include the PLMN IDs and the qualities of all available PLMNs.

In an embodiment, each LOPS PLMN is assigned with an LOPS-dedicated PLMN ID so as to be distinguished from a normal PLMN ID of a normal PLMN. In another embodiment, one or multiple LOPS-dedicated PLMN IDs are predefined and stored in the smartcard of the user equipment. When a PLMN ID of a specific PLMN matches one of the predefined LOPS-dedicated PLMN IDs, it means that the specific PLMN is an IOPS PLMN. As previously stated, a normal PLMN is an entity which is currently connected to the macro EPC, while an IOPS PLMN an entity which has lost backhaul to the macro EPC or is isolated from the macro EPC. Therefore, there is no connectivity between a first UE which operates in state S1 and a second UE which operates in state S2.

In step 540, if it is determined that the available PLMNs include the second PLMN which is currently unable to provide connectivity to the first PLMN, step 550 is then executed for selecting the second PLMN as the secondary PLMN so that the user equipment may register on both the primary PLMN and the secondary PLMN. For example, assuming that the first PLMN is a normal PLMN and the available PLMNs include the second PLMN which is an IOPS PLMN, the UE is configured to register on both the first PLMN and the second PLMN. Similarly, assuming that the first PLMN is an IOPS PLMN and the available PLMNs include the second PLMN which is a normal PLMN, the UE is configured to register on both the first PLMN and the second PLMN. Referring to FIG. 6, the user equipment may switch from state S1 or S2 to state S3 after executing step 550, as indicated by arrow A3 or A4.

In the present invention, the user equipment may operate in state S3 by registering on both the primary PLMN and the secondary PLMN using various methods. In an embodiment when the user equipment is a single SIM terminal, the only SIM card may be used to alternatively listen to a first cell in the primary PLMN at a first time slot and a second cell in the secondary PLMN at a second time slot, wherein the first time slot and the second time slot are not overlapped. In another embodiment when the user equipment is a dual SIM standby (DSS) terminal or a dual SIM dual standby (DSDS) terminal, the SIM card specified by the user or selected according to a predetermined rule may be used to alternatively listen to a first cell in the primary PLMN at a first time slot and a second cell in the secondary PLMN at a second time slot, wherein the first time slot and the second time slot are not overlapped. In yet another embodiment when the user equipment is a dual SIM dual active (DSDA) terminal, a first SIM card may be used to listen to a first cell in the primary PLMN and a second SIM card may be used to listen to a second cell in the secondary PLMN simultaneously. However, the method of performing registration on multiple PLMNs does not limit the scope of the present invention.

If it is determined that the available PLMNs do not include the second PLMN which is currently unable to provide connectivity to the first PLMN or after the user equipment has registered on both the primary PLMN and the secondary PLMN in step 550, step 560 is then executed for determining if the user equipment needs to detach from the primary PLMN or the secondary PLMN.

If the user equipment is currently operating in state S3, the NAS layer of the user equipment may periodically request the AS layers to report information associated with all available PLMNs. When a failure occurs, access to the primary PLMN or the secondary PLMN may no longer be available to the user equipment. Under such circumstance, it may be determined in step 560 that the user equipment needs to detach from any or both of the primary PLMN and the secondary PLMN due to registration failure. Referring to FIG. 6, the user equipment may switch from state S3 to state S1, S2 or S4 after executing step 570, as indicated by arrow A5, A6 or A7.

Before the user equipment switches from state S3 to state S1, the local EPC may further be configured to delete all registration data of the user equipment so as to prevent duplicated user data in the local EPC and the macro EPC.

If the user equipment is currently operating in state S1 or S2, the NAS layer of the user equipment may periodically request the AS layers to report information associated with all available PLMNs. When a failure occurs, access to the primary PLMN may no longer be available to the user equipment. Under such circumstance, it may be determined in step 560 that the user equipment needs to detach from the primary PLMN due to registration failure. Referring to FIG. 6, the user equipment may switch from state S1 or S2 to state S4 after executing step 570, as indicated by arrow A8 or A9.

Although the present invention addresses automatic PLMN selection, it is to be noted that the state transitions as indicated by arrows A5-A9 in FIG. 6 may also be manually initiated by a user.

Figure 1:
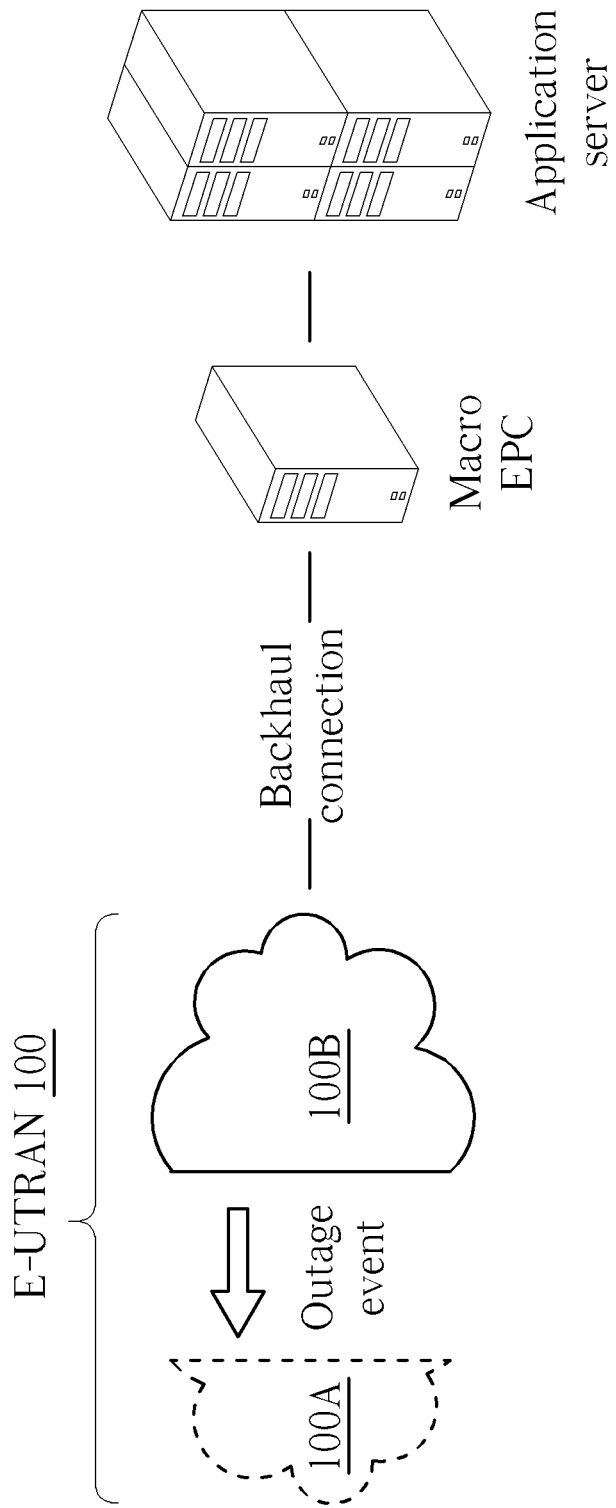
FIG. 1 is a diagram illustrating an LOPS architecture of an E-UTRAN in response to an outage event within the network.
Figure 2:
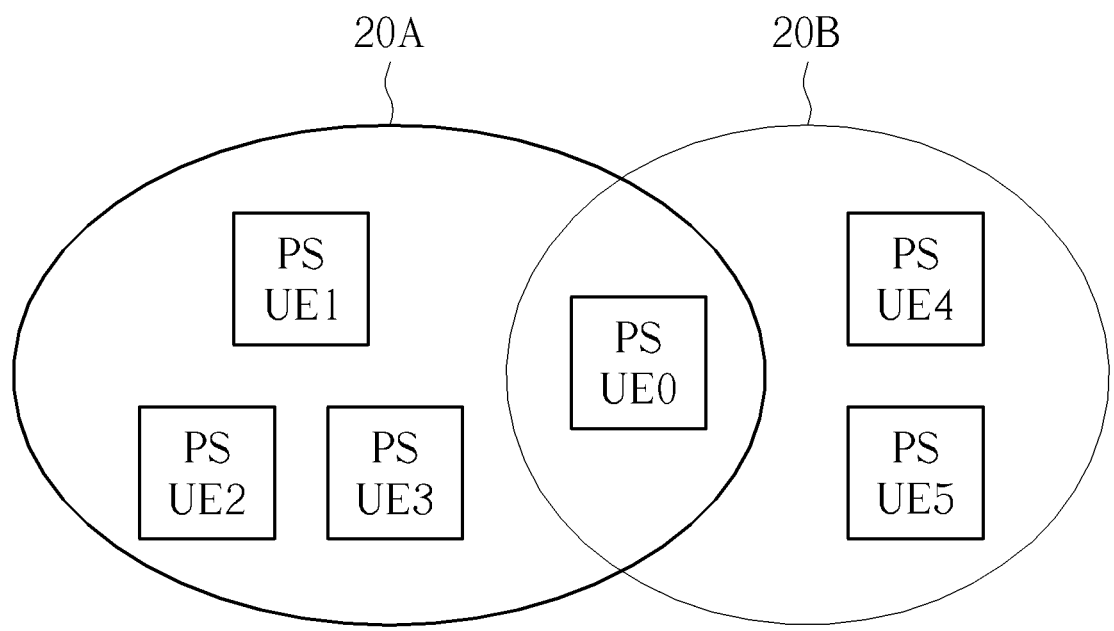
FIG. 2 is a diagram illustrating UE behavior in an LOPS-capable wireless communication system.

Referring to FIG. 2 again, the PS UE1~UE3 may be served by one or multiple cells in the LOPS-mode eNB1 and the PS UE4~UE5 may be served by one or multiple cells in the normal-mode eNB2. The PS UE0 is under the coverage of both the LOPS-mode eNB1 and the normal-mode eNB2. According to the present invention, the PS UE0 may register on both the LOPS-mode eNB1 and the normal-mode eNB2, thereby capable of communicating with all of the PS UE1~UE5.

In the IOPS-capable wireless communication system for implementing the above-mentioned methods described with reference to FIGS. 5 and 6, the user equipment can serve as a transmitting end on uplink and as a receiving end on downlink, while the eNB can serve as a receiving end on uplink and as a transmitting end on downlink.

Figure 7:
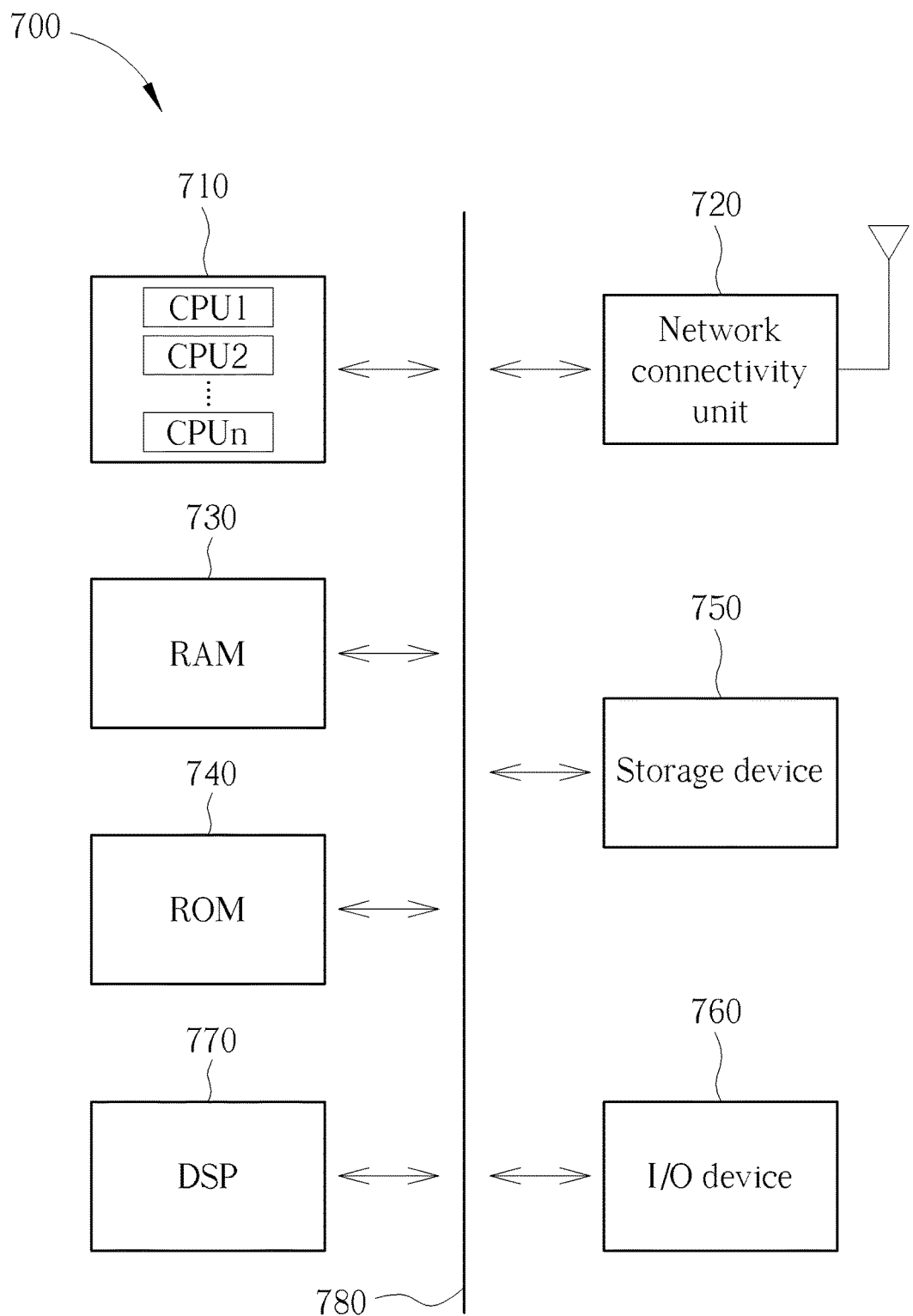
FIG. 7 is a functional diagram illustrating a system used in an IOPS-capable wireless communication system for carrying out the present method.

FIG. 7 is a functional diagram illustrating a system 700 which may be used in the user equipment and the eNB for carrying out the present method. The system 700 includes a processing component 710, a network connectivity unit 720, random access memory (RAM) 730, read only memory (ROM) 740, a storage device 750, an input/output (I/O) device 760, and a digital signal processor (DSP) 770. These components might communicate with one another via a bus 780. In some cases, some of these components may not be present or may be combined in various combinations with one another or with other components not shown. These components might be located in a single physical entity or in more than one physical entity. Any actions described herein as being taken by the processing component 710 may be taken by the processing component 710 alone or by the processing component 710 in conjunction with one or more components shown or not shown in the drawing, such as with the DSP 770. Although the DSP 770 is shown as a separate component, the DSP 770 might be incorporated into the processing component 710.

The processing component 710 is configured to execute instructions, codes, computer programs, or scripts which may be accessed from the network connectivity units 720, RAM 730, ROM 740, or the storage device 750. In a hardware configuration, the processing component 710 may include one or multiple processors CPU1-CPUn for executing the present method simultaneously, serially, or otherwise by one processor. The one or multiple processors CPU1-CPUn may include one or more application specific integrated circuits (ASICs), DSPs, digital signal processing devices (DSPDs), programmable logic devices (PLDs), field programmable gate arrays (FPGAs), controllers, microcontrollers, microprocessors, or any combination of above. In a firmware or software configuration, software code may be stored in the RAM 730, the ROM 740 or the storage device 750 and executed by the processing component 710 for achieving the exemplary embodiments of the present invention.

The network connectivity unit 720 may include one or multiple modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM/UMTS/LTE radio transceiver devices, worldwide interoperability for microwave access (WiMAX) devices, and/or other well-known devices for connecting to the eNB. The network connectivity unit 720 allows the processing component 710 to communicate with the Internet or one or more telecommunications networks.

The RAM 730 may be used to store volatile data and instructions that are executed by the processing component 710. The ROM 740 may be used to store instructions and data that are read during execution of the instructions. The storage device 750 may include various disk-based systems such as hard disk, floppy disk, or optical disk and may be used to store programs that are loaded into the RAM 730 when such programs are selected for execution. Access to both the RAM 730 and the ROM 740 is typically faster than access to the storage device 750, but the storage device 750 can provide larger memory capacity.

The I/O devices 760 may include one or more of liquid crystal display (LCD) screens, touch screen displays, keyboards, keypads, switches, dials, mice, track balls, voice recognizers, card readers, paper tape readers, printers, video monitors, or other well-known input/output devices.

In the present invention, the user equipment may be any LOPS-capable transportable electronic device such as a mobile telephone, a personal digital assistant (PDA), a hand-held computer, a tablet, a nettop, a laptop computer, or any device with similar telecommunication capabilities. However, the type of the user equipment does not limit the scope of the present invention.

As well-known to those skilled in the art, the term "UE (user equipment)" may be replaced with the terms "MS (mobile station), "SS (subscriber station)", "MSS (mobile subscriber station), "AMS (advanced mobile station)", mobile terminal, etc. Also, the term "eNB" may be replaced with the terms "BS (base station), "fixed station", "NB", "ABS (advanced base station), "AP (access point), etc.

In the present invention, when an LOPS-capable user equipment is under the coverage of both an LOPS-mode eNB and a normal-mode eNB, the user equipment is configured to perform automatic PLMN by registering on both the IOPS-mode eNB and the normal-mode eNB. Therefore, the present invention can improve UE's ability to maintain both normal-mode communications and IOPS mode communications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing an automatic public land mobile network (PLMN) selection in an IOPS (isolated evolved universal terrestrial radio access network operations for public safety) capable wireless communication system, comprising:

a user equipment selecting a first PLMN as a primary PLMN and registering on the primary PLMN;

the user equipment performing a PLMN search when registering on the primary PLMN;

the user equipment determining whether a second PLMN can be detected in the PLMN search and is currently unable to provide connectivity to the first PLMN;

the user equipment selecting the second PLMN as a secondary PLMN if the second PLMN is detected in the PLMN search and is currently unable to provide connectivity to the first PLMN; and the user equipment registering on both the primary PLMN and the secondary PLMN after selecting the secondary PLMN, wherein:

the first PLMN is a normal PLMN connected to a macro evolved packet core (EPC) which serves the user equipment in a normal mode of operation, and the second PLMN is an IOPS PLMN connected to a local EPC which provides a local connectivity and public safety services to the user equipment in an IOPS mode of operation when a backhaul from the IOPS PLMN to the macro EPC is lost or not available to the user equipment.

2. The method of claim 1, further comprising:

assigning a normal PLMN identity to the first PLMN or the second PLMN for use in the normal mode of operation; and assigning an IOPS-dedicated PLMN identity to the first PLMN or the second PLMN for use in the IOPS mode of operation.

3. The method of claim 1, further comprising:

storing an IOPS-dedicated PLMN identity associated with the first PLMN or the second PLMN for use in the IOPS mode of operation in a smartcard of the user equipment.

4. The method of claim 1, wherein the user equipment performing the PLMN search includes:

access stratum (AS) layers of the user equipment reporting information associated with all available PLMNs to a non-access stratum (NAS) layer of the user equipment; and the NAS layer determining if the available PLMNs include the second PLMN.

5. The method of claim 1, further comprising:

determining if the user equipment needs to detach from the primary PLMN or the secondary PLMN based on a signal quality of the primary PLMN or a signal quality the secondary PLMN.

6. The method of claim 1, further comprising:

the user equipment remaining registering on the primary PLMN if the second PLMN cannot be detected in the PLMN search.

7. The method of claim 1, wherein the user equipment registering on both the primary PLMN and the secondary PLMN includes:

the user equipment listening to a first cell in the primary PLMN at a first time slot using a smartcard; and the user equipment listening to a second cell in the secondary PLMN at a second time slot using the smartcard, wherein the first time slot and the second time slot are not overlapped.

8. The method of claim 1, wherein the user equipment registering on both the primary PLMN and the secondary PLMN includes:

the user equipment listening to a first cell in the primary PLMN at a first time slot using a first smartcard; and the user equipment listening to a second cell in the secondary PLMN at a second time slot using a second smartcard, wherein the first time slot and the second time slot are not overlapped.

9. The method of claim 1, wherein the user equipment registering on both the primary PLMN and the secondary PLMN includes:

the user equipment listening to a first cell in the primary PLMN using a first smartcard and listening to a second cell in the secondary PLMN using a second smartcard simultaneously.

* * * * *